United States Patent Office 2,762,797
Patented Sept. 11, 1956

2,762,797

DIHALOTRIAZINES

Ingenuin Hechenbleikner, Stamford, Conn., assignor to American Cyanamid Company, New York, N. Y., a corporation of Maine No Drawing. Application February 23, 1955,
Serial No. 490,120

3 Claims. (Cl. 260—248)

The present invention relates to the 2,4-dihalo-s-triazines, and to a method for their preparation. As such, it constitutes a continuation-in-part of my copending application for United States Letters Patent Serial No. 298,173, filed July 10, 1952, which in turn is a continuation-in-part of my application Serial No. 166,548, filed June 6, 1950.

In general, the compounds of the present invention may be represented by the general formula:

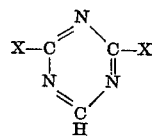

wherein X represents a halogen radical, particularly the chloride and bromide radicals.

In general, the compounds of the present invention are readily prepared by the reaction of a cyanogen halide (XCN, where X is halogen) with HCN under substantially anhydrous conditions in the presence of a suitable catalyst. The reaction may be illustrated by the following over-all equation:

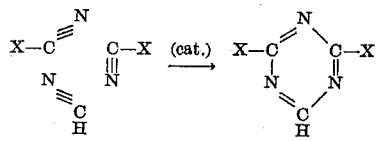

In carrying out the reaction, any cyanogen halide may be used, but the chloride and bromide are the most useful commercially for economic reasons. The ratio of cyanogen halide to HCN is not critical.

In general, the process of the present invention is readily carried out if certain other precautions are observed. These may be summarized as follows:

(1) A small amount of catalyst must be used. Catalysts for the reaction include HCl, HBr, $AlCl_3$, $AlBr_3$, and dichloromethylformamidine hydrochloride or hydrobromide. If too much catalyst is present, the cyanogen halide reactant is polymerized to cyanuric halide before it can react with HCN to form a dihalo-s-triazine. Therefore, the amount of catalyst should not exceed about 20 mole percent of the cyanogen halide. The preferred amount of catalyst is 0.01–0.10 mole per mole of cyanogen halide.

(2) Water cannot be present in more than trace amounts. It has been found that water reacts with cyanogen halide at the reaction temperature, forming cyanic acid, ammonia, cyanamide, etc., which in turn quickly form various triazines containing basic amino groups, thereby withdrawing the acidic catalyst from the reaction.

(3) There is a certain minimum reaction time, depending on the temperature. If the reactants are permitted to stand in a closed vessel at room temperature, about 4–5 weeks are required to form the desired product. When heating the reactants in a closed vessel or under reflux at temperatures of 40° to 80° C., a fair yield of product is obtained after about 48 and 2 hours respectively. Temperatures above about 100° C. are undesirable.

It is because of one or more of the above necessary features of the instant invention that the dihalo-s-triazines are not formed in various processes of the prior art wherein, for example, ClCN, HCN, and HCl were present in the same reaction solution.

The process of the present invention may be illustrated by the following examples, which are intended as illustrative only and not by way of limitation. Unless otherwise noted, all parts are by weight.

Example 1

A mixture of 2 equivalents of cyanogen chloride and 1 equivalent of hydrogen cyanide is heated with 0.10 equivalent of hydrogen chloride as a catalyst at 60° C. for 12 hours in a stoppered flask. Thus-formed 2,4-dichloro-s-triazine is recovered by distilling off the unreacted reagents, dissolving the residue in benzene, filtering resultant solution to remove any insolubles and distilling the benzene extract. Product compound distills at 100–102° C./75 mm. It solidifies at normal room conditions. It melts at 52–54° C. and can be recrystallized from hexane.

Instead of cyanogen chloride, other cyanogen halides, such as cyanogen bromide, can be used under conditions analogous to those of Example 1 to form the corresponding 2,4-dihalo-s-triazine.

The new compounds of the present invention are variously useful in the various arts as intermediates in the preparation of resins; pharmaceutical preparations, for example the halo substitutent readily reacts with ammonia to form formoguanamine, a known diuretic; and in the preparation of useful vat dyestuffs. The latter practice may be exemplified by the following illustrative example in which the solvent is measured by volume and the remaining parts are by weight.

Example 2

One mol equivalent of alpha-aminoanthraquinone (223) parts) is stirred into 2,000 parts of nitrobenzene containing about 1 part of pyridine at about 120° C. and one-half mol of 2,4-dichloro-s-triazine (75 parts) obtained in Example 1 is added. A temperature of about 120° C. is maintained until reaction substantially ceases. After the reaction mixture is cooled, the product is separated and washed with nitrobenzene and ethanol. It is then dried. Resultant reaction product, 2,4 bis (1-anthraquinonylamino)-1,3,5 triazine, is obtained in the form of a yellow solid which dyes cotton from an alkaline hydrosulfate vat clear yellow shades of good fastness.

While the invention has been described with particular reference to specific embodiments, it is to be understood that it is not to be limited thereto but is to be construed broadly and restricted solely by the scope of the appended claims.

I claim:

1. The method of preparing a 2,4-dihalo-s-triazine which comprises admixing hydrogen cyanide with a cyanogen halide under essentially anhydrous conditions in the presence of a catalyst of the group consisting of hydrogen chloride, hydrogen bromide, aluminum chloride, aluminum bromide, dichloromethylformamidine hydrochloride, and dichloromethylformamidine hydrobromide, said catalyst being present in an amount not exceeding about 0.2 mole per mole of cyanogen halide and maintaining the mixture for times and temperatures ranging from about at least 4 weeks at room temperature to at least 2 hours at 80° C.

2. The method according to claim 1 in which the cyanogen halide is cyanogen chloride.

3. The method according to claim 2 in which the catalst is hydrogen chloride.

References Cited in the file of this patent
UNITED STATES PATENTS

| | | |
|---|---|---|
| 1,911,689 | Heintrich | May 30, 1933 |
| 2,653,934 | Kaiser | Sept. 29, 1953 |